(12) United States Patent
Kilper et al.

(10) Patent No.: US 7,154,665 B2
(45) Date of Patent: Dec. 26, 2006

(54) OPTICAL PERFORMANCE MONITORING USING A SEMICONDUCTOR OPTICAL AMPLIFIER

(75) Inventors: Daniel C. Kilper, Rumson, NJ (US); Juerg Leuthold, Eatontown, NJ (US); Philipp Vorreau, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 314 days.

(21) Appl. No.: 10/638,459

(22) Filed: Aug. 11, 2003

(65) Prior Publication Data

US 2005/0052727 A1 Mar. 10, 2005

(51) Int. Cl.
*H01S 3/00* (2006.01)
(52) U.S. Cl. .................................... 359/344
(58) Field of Classification Search ............... 398/25, 398/26, 29
See application file for complete search history.

(56) References Cited

U.S. PATENT DOCUMENTS

| | | | | |
|---|---|---|---|---|
| 5,353,146 | A | 10/1994 | Webb ......................... | 359/158 |
| 6,252,692 | B1* | 6/2001 | Roberts ...................... | 398/147 |
| 6,317,232 | B1 | 11/2001 | Fee et al. ................... | 359/124 |
| 6,396,051 | B1 | 5/2002 | Li et al. ................ | 250/227.18 |
| 6,433,899 | B1* | 8/2002 | Anslow et al. ................ | 398/5 |
| 6,433,901 | B1 | 8/2002 | Cao ........................... | 359/110 |
| 6,498,671 | B1* | 12/2002 | Janz et al. ................... | 359/237 |
| 6,515,796 | B1* | 2/2003 | Jackel ........................ | 359/344 |
| 6,577,435 | B1* | 6/2003 | Bang et al. ................. | 359/326 |
| 6,577,654 | B1* | 6/2003 | Dijaili et al. ................. | 372/20 |
| 6,609,220 | B1* | 8/2003 | Kaji ........................... | 714/704 |
| 6,671,074 | B1* | 12/2003 | Akashi ....................... | 398/202 |
| 6,717,718 | B1* | 4/2004 | Kelsoe et al. ............... | 359/333 |
| 6,778,730 | B1* | 8/2004 | Hironishi .................... | 385/24 |
| 6,804,047 | B1* | 10/2004 | Byun et al. ................. | 359/344 |
| 2002/0105706 | A1* | 8/2002 | Ueno ......................... | 359/179 |
| 2002/0122245 | A1* | 9/2002 | Morito ....................... | 359/344 |
| 2003/0169473 | A1* | 9/2003 | Cotter et al. ............... | 359/245 |
| 2003/0174393 | A1* | 9/2003 | Maeda et al. .............. | 359/344 |
| 2004/0047283 | A1* | 3/2004 | Bonwick et al. ........... | 370/201 |

(Continued)

FOREIGN PATENT DOCUMENTS

WO    WO 2086616 A1 * 10/2002

OTHER PUBLICATIONS

Leuthold et al. All-Optical Wavelength Conversion Between 10 and 100 Gb/s with SOA delayed-interference configuration. Optical and Quantum Electronics 33: 939-952, 2001.*

(Continued)

*Primary Examiner*—Deandra M. Hughes

(57) ABSTRACT

An optical device having a semiconductor optical amplifier (SOA) coupled to an optical filter, which device may be used for optical performance monitoring. One embodiment of the invention provides an optical regenerator/monitor (RM), in which an SOA is used both for optical regeneration of a communication signal applied to the RM and for evaluation of the quality of that signal. The RM has (i) a 2R regenerator, which includes the SOA and an optical filter, and (ii) a relatively simple signal processor configured to receive optical signals from two or more sampling points located at the regenerator. In one configuration, the processor evaluates the quality of the communication signal by comparing optical power tapped from the input and output of the regenerator. The RM, so configured, can be used, for example, to monitor chromatic dispersion and/or optical noise in the communication signal. Advantageously, a single RM of the invention can perform network functions of two separate prior-art devices, a regenerator and an optical performance monitor.

30 Claims, 8 Drawing Sheets

U.S. PATENT DOCUMENTS

2004/0090662 A1    5/2004  Bang et al. ............... 359/326
2004/0208610 A1*  10/2004  Grosz et al. .............. 398/148

OTHER PUBLICATIONS

"All-Optical Wavelength Conversion Between 10 and 100 Gb/s with SOA Delayed-Interference Configuration," by J. Leuthold, B. Mikkelsen, G. Raybon, C.H. Joyner, J.L. Pleumeekers, B.I. Miller, K. Dreyer, R. Behringer, Optical and Quantum Electronics, vol. 33, No. 7-10, pp. 939-952, Jul. 2001.

"All-optical Wavelength Converter Based on A Ppulse Reformatting Optical Filter," J. Leuthold, D. Marom, S. Cabot, R. Ryf, P. Bernasconi, F., Baumann, J. Jaques, D.T. Neilson, C.R. Giles, Proc. Optical Fiber Communications Conference (OFC'2003), Atlanta, USA, PD41, Mar. 2003.

* cited by examiner

OPTICAL PERFORMANCE MONITORING USING A SEMICONDUCTOR OPTICAL AMPLIFIER

BACKGROUND OF THE INVENTION

1. Field of the Invention

The present invention relates to optical communication systems and, more specifically, to monitoring the performance of such systems.

2. Description of the Related Art

Fiber optic networks are widely used for data transmission in modem communication systems. Due to increasing data traffic volumes, monitoring and management of networks become increasingly important. For example, such monitoring may include a measurement at a particular point in the network of the quality of an optical signal corresponding to one or more optical communication channels. The optical signal may be analyzed for various impairments, e.g., timing jitter, noise level, chromatic dispersion, and the like. Obtained information may then be used to improve the performance of the network, for example, if certain impairments exceed a tolerable level.

FIG. 1 shows a block diagram of a representative fiber-optic network 100 configured to carry optical signals modulated with data from a source node 102 to a destination node 112 via a plurality of intermediate nodes 104. An optical transmission link 120 connects a pair of intermediate nodes 104A and 104B via an optical fiber 106. Link 120 may include one or more optical amplifiers, optical regenerators, and optical performance monitors. In FIG. 1, link 120 is illustratively shown as having one optical amplifier (OA) 108, one regenerator 110, and one optical performance monitor (OPM) 114. Amplifier 108 is located between sections 106A and 106B of fiber 106 and is configured to boost optical signals attenuated by light absorption in section 106A. Regenerator 110 is located before node 104B and is configured to correct optical impairments induced by the preceding network components, e.g., fiber 106 and OA 108. OPM 114 is optically coupled to section 106B and is configured to monitor the quality of optical signals received by regenerator 110.

Depending on the particular implementation, regenerator 110 may be designed to perform reshaping and re-amplification (2R) or reshaping, re-amplification, and retiming (3R) of optical signals. Descriptions of representative prior-art 2R and 3R regenerators can be found in U.S. Pat. Nos. 6,498,671, 6,317,232, and 5,353,146, the teachings of all of which are incorporated herein by reference.

In a typical implementation, OPM 114 operates by converting an optical signal into a corresponding electrical signal and then analyzing the electrical signal for impairments using electrical signal processing methods. However, one disadvantage of such an OPM is that it typically requires high-speed electronics. Furthermore, at relatively high bit rates, e.g., about 40 Gb/s, either the sensitivity or bandwidth of the electronics may be insufficient to accurately and/or cost-effectively measure the impairments. On the other hand, optical methods applied to monitoring optical signals have certain advantages over electrical methods because at least part of the signal processing is accomplished in the optical domain. Descriptions of representative optical-domain-based OPMs can be found in U.S. Pat. Nos. 6,433,901 and 6,396,051, the teachings of both of which are also incorporated herein by reference. However, one problem with such optical-domain-based OPMs is that they often require relatively expensive optical components, such as nonlinear crystals, interferometers, tunable filters, etc.

SUMMARY OF THE INVENTION

Problems in the prior art are addressed, in accordance with the principles of the present invention, by an optical device having a semiconductor optical amplifier (SOA) coupled to an optical filter, which device may be used for optical performance monitoring. One embodiment of the invention provides an optical regenerator/monitor (RM), in which an SOA is used both for optical regeneration of a communication signal applied to the RM and for evaluation of the quality of that signal. The RM has (i) a 2R regenerator, which includes the SOA and an optical filter, and (ii) a relatively simple signal processor configured to receive optical signals from two or more sampling points located at the regenerator. In one configuration, the processor evaluates the quality of the communication signal by comparing optical power tapped from the input and output of the regenerator. The RM, so configured, can be used, for example, to monitor chromatic dispersion and/or optical noise in the communication signal. Advantageously, a single RM of the invention can perform network functions of two separate prior-art devices, a regenerator and an optical performance monitor.

According to one embodiment, the present invention is a device, comprising: a semiconductor optical amplifier (SOA) adapted to receive an input optical signal; a first optical filter coupled to an output of the SOA to produce a first filtered signal; and a signal processor adapted to measure optical power corresponding to each of the input and first filtered signals to monitor signal quality of the input signal.

According to another embodiment, the present invention is a method of monitoring signal quality, comprising: (A) applying an input optical signal to a semiconductor optical amplifier (SOA); (B) optically filtering at least a portion of a signal generated by the SOA to produce a first filtered signal; and (C) measuring optical power corresponding to each of the input and first filtered signals to monitor signal quality of the input signal.

According to yet another embodiment, the present invention is an optical communication network configured to transmit optical communication signals between network nodes, the network including a device comprising: a semiconductor optical amplifier (SOA) adapted to receive an input optical signal; a first optical filter coupled to an output of the SOA to produce a first filtered signal; and a signal processor adapted to measure optical power corresponding to each of the input and first filtered signals to monitor signal quality of the input signal.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
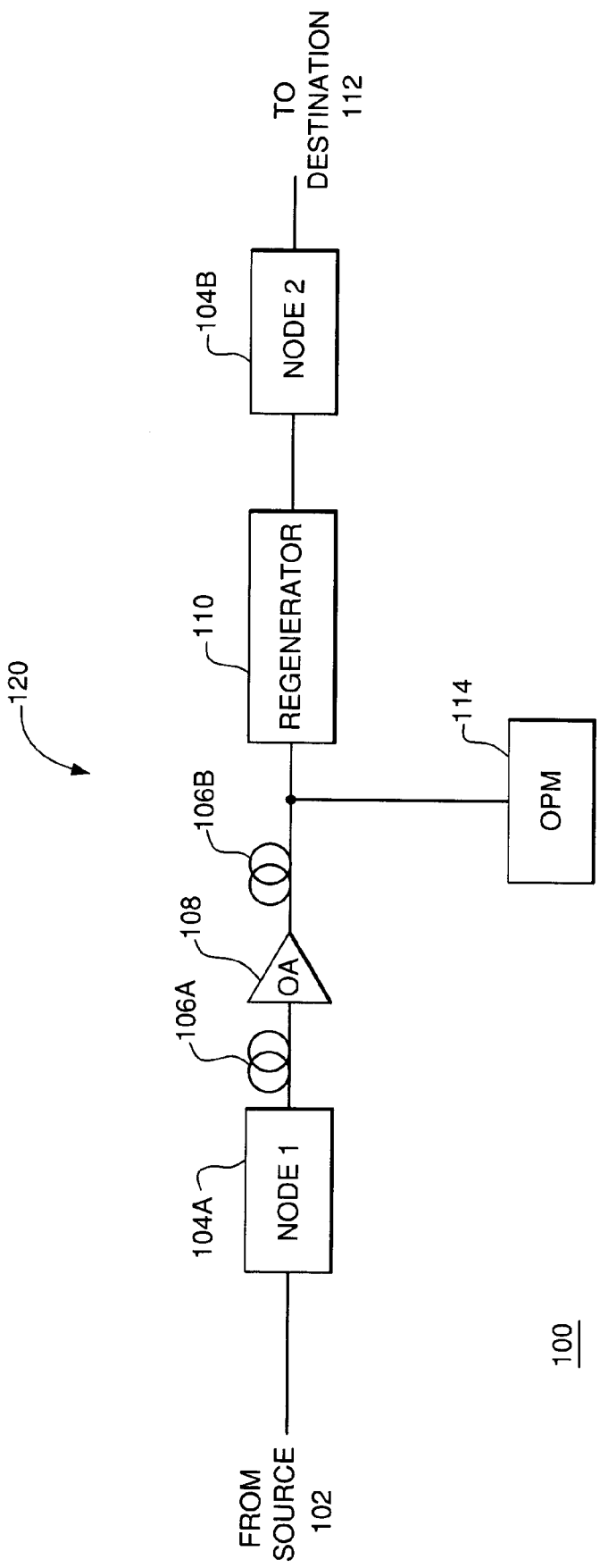
FIG. 1 shows a block diagram of a representative prior-art fiber-optic network.
Figure 2:
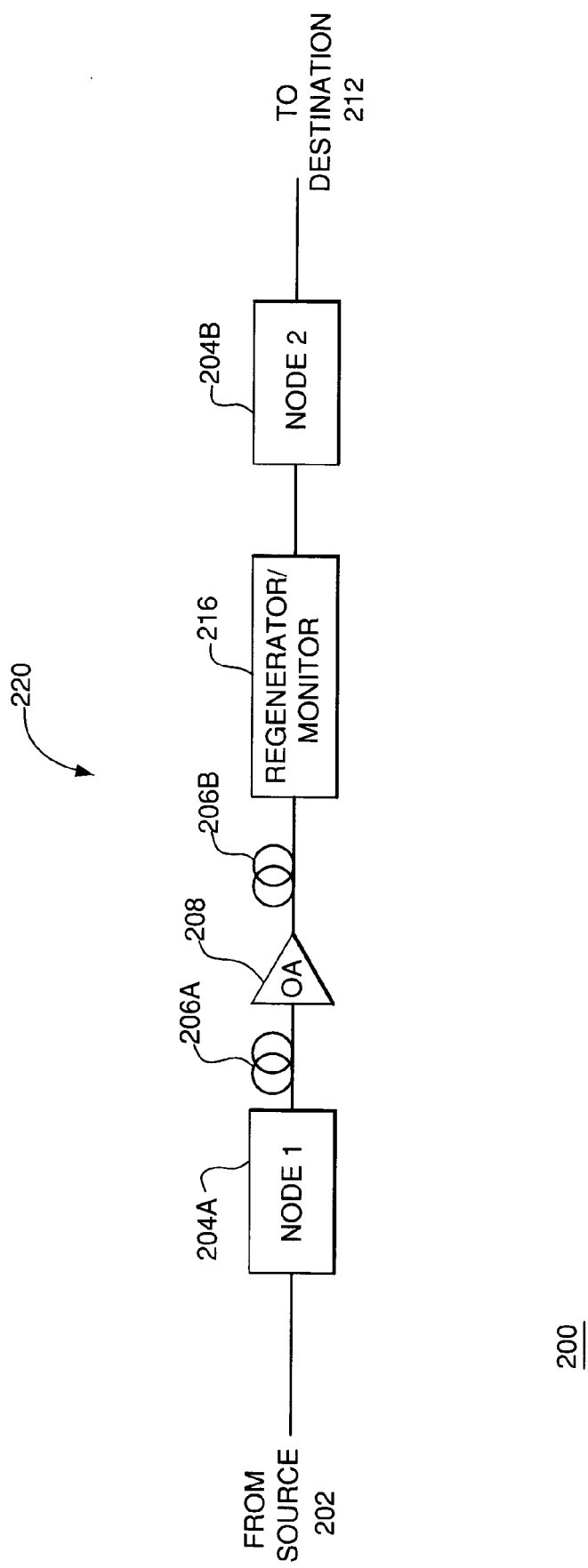
FIG. 2 shows a block diagram of a fiber-optic network according to one embodiment of the present invention.

FIG. 2 shows a block diagram of a fiber-optic network 200 according to one embodiment of the present invention. Network 200 is analogous to network 100 of FIG. 1 with analogous elements of the two networks marked with labels having the same last two digits. However, one difference between networks 200 and 100 is that network 200 employs a novel regenerator/monitor (RM) 216, which performs functions analogous to those of the combination of regenerator 110 and OPM 114 in network 100. As will be explained below, some optical components in RM 216 are used both for optical regeneration of a communication signal applied to the RM and evaluation of the quality of that signal. Due to the component sharing, the cost of RM 216 may be substantially reduced compared to that of the combination of regenerator 110 and OPM 114 in network 100.

Figure 3:
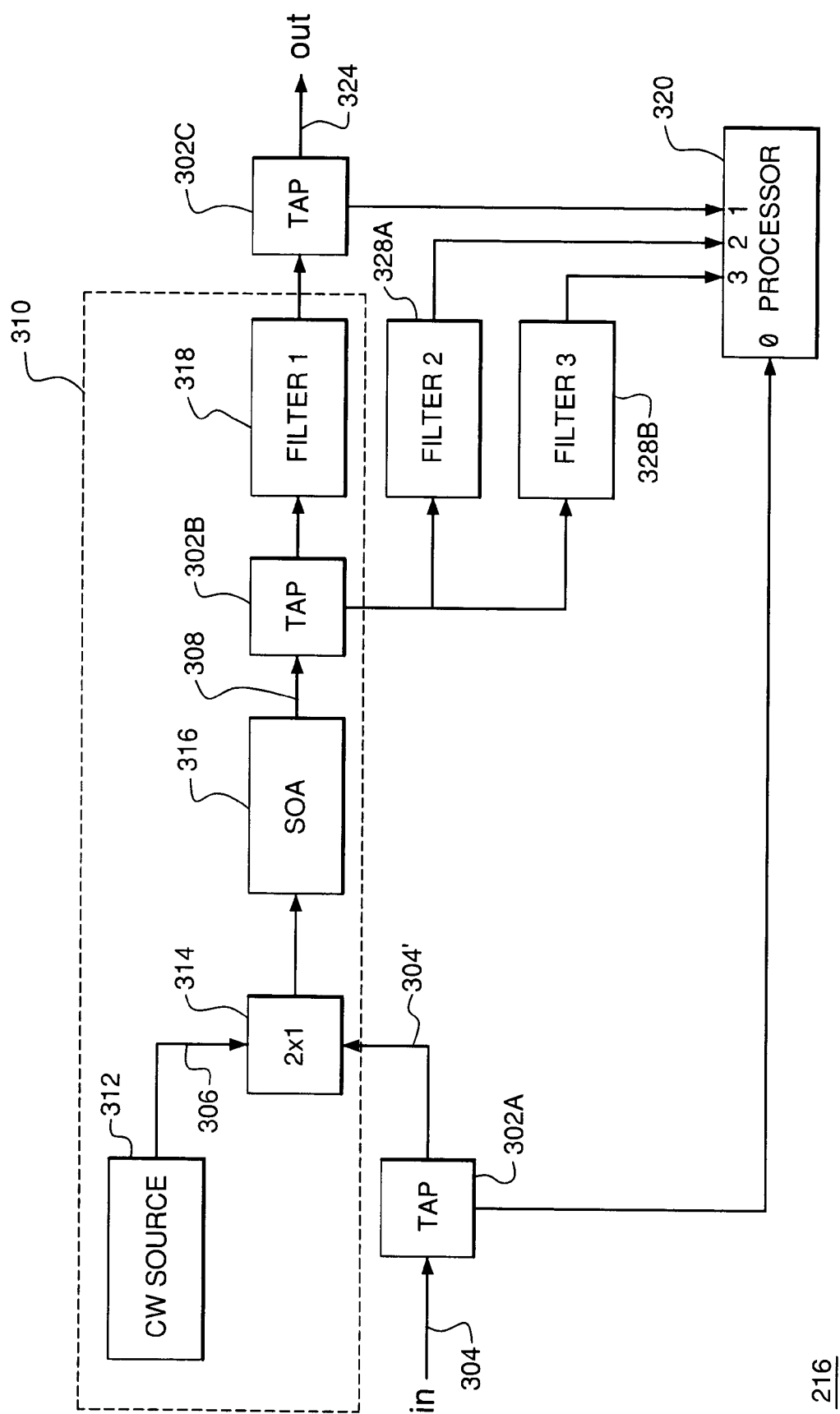
FIG. 3 shows a block diagram of a regenerator/monitor (RM) that can be-used in the network of FIG. 2 according to one embodiment of the present invention.

FIG. 3 shows a block diagram of an RM 300 that can be used as RM 216 (FIG. 2) according to one embodiment of the present invention. RM 300 includes an optical regenerator 310 and a signal processor 320. Processor 320 has one primary port and one or more secondary ports, each port coupled to a sampling point at regenerator 310. The sampling point corresponding to the primary port (labeled 0 in FIG. 3) is a tap 302A located at the input port of regenerator 310. The sampling points corresponding to the (illustratively three) secondary ports (labeled 1 through 3) are located as follows. The sampling point corresponding to secondary port 1 is a tap 302C located at the output port of regenerator 310; and the sampling point corresponding to secondary ports 2 and 3 is a tap 302B located within the regenerator. Tap 302B is coupled to ports 2 and 3 via filters 328A and 328B, respectively. At each port, processor 320 has a power meter (not shown) configured to measure average optical power received at that port, where the averaging is performed over a certain time interval, e.g., about 100 ms or greater than about $10^9$ optical bits. Processor 320 evaluates the quality of an optical communication signal 304 applied to RM 300 based on said power measurements. For example, in one configuration, processor 320 generates a first quality measure (corresponding to port 1) by computing a ratio of the optical power received at secondary port 1 to the optical power received at primary port 0. Similarly, one or more additional quality measures may be generated based on power measurements at other secondary ports. As will be further explained below, each quality measure may be used to evaluate one or more impairments in signal 304.

In one embodiment, regenerator 310 is a 2R regenerator designed to convert signal 304 into a new signal 324, which new signal carries the same data as signal 304, but has a different carrier wavelength. It is also possible to configure regenerator 310 such that signal 324 has the same carrier wavelength as signal 304. Advantageously, signal 324 has improved characteristics, e.g., (i) pulse shapes that are substantially free of distortions, (ii) relatively high power, and (iii) relatively high optical signal-to-noise ratio (OSNR).

A 3-dB coupler 314 combines signal 304' applied to regenerator 310 via tap 302A with a monochromatic continuous wave (CW) beam 306 produced by a CW source (e.g., laser) 312. Alternatively, a waveguide grating router, a circulator, an asymmetric splitter, a grating, or another suitable device may be utilized, as known in the art, in place of coupler 314. The combined signal is then applied to a semiconductor optical amplifier (SOA) 316, the output of which (labeled in FIG. 3 as signal 308) is passed through a filter 318 to produce signal 324. Wavelength conversion in regenerator 310 is achieved due to the cross-phase-modulation-induced chirp in SOA 316. More specifically, when signal 304 has an optical "0", substantially only the CW light of beam 306 is coupled into and amplified by SOA 316. However, transmission characteristics of filter 318 are chosen such that the wavelengths corresponding to beam 306 are suppressed by the filter. As a result, substantially no light appears at the output of regenerator 310, thereby producing an optical "0" in signal 324. When signal 304 has an optical "1", signal 304' and beam 306 become nonlinearly coupled in SOA 316. This coupling produces a chirp of the CW signal corresponding to beam 306 toward longer (red) and shorter (blue) wavelengths at the leading and trailing edges, respectively, of each pulse representing an optical "1" in signal 304'. While filter 318 blocks the blue-shifted light, it allows the red-shifted light to pass, thereby producing an optical "1" in signal 324. Beam 306 may also be affected by cross-gain modulation of SOA 316 by signal 304'. As already indicated above, signal 324 is a reshaped and re-amplified (2R) replica of signal 304.

Figure 4:
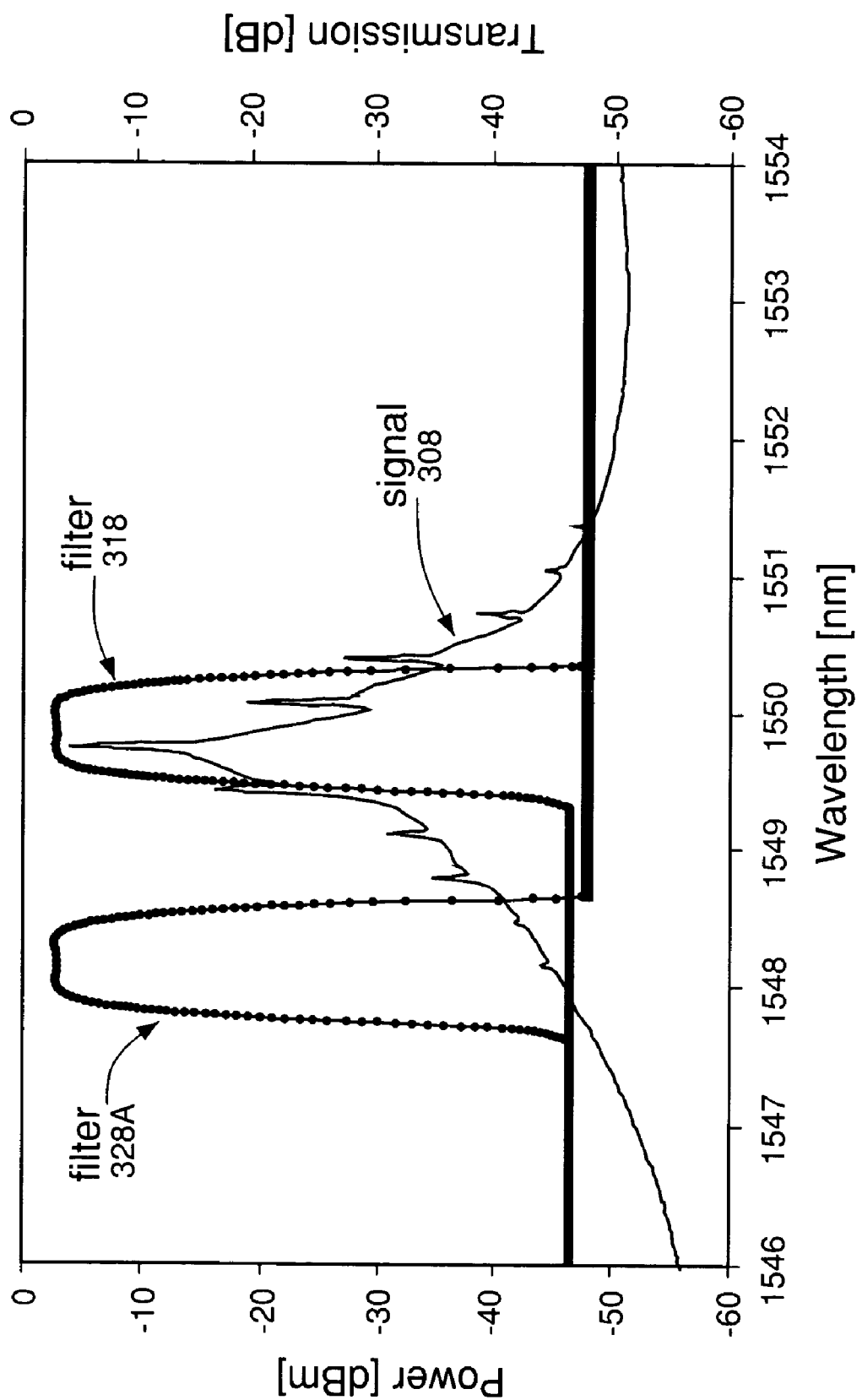
FIG. 4 graphically illustrates a representative configuration of the RM shown in FIG. 3.

FIG. 4 graphically illustrates one representative configuration of RM 300, which configuration may be used to evaluate the OSNR of signal 304. In particular, FIG. 4 shows a representative spectrum of signal 308 corresponding to the following characteristics of signal 304 and beam 306. Signal 304 is a 33% duty factor, 40 Gb/s return-to-zero (RZ) pseudo-random bit stream (PRBS) having a carrier wavelength of about 1559.0 nm, and beam 306 has a wavelength of about 1549.2 nm. In addition, FIG. 4 shows representative transmission curves of filters 318 and 328A, each of which is a 0.8-nm band-pass filter, the former centered at about 1549.9 nm and the latter centered at about 1548.2 nm.

Figure 5:
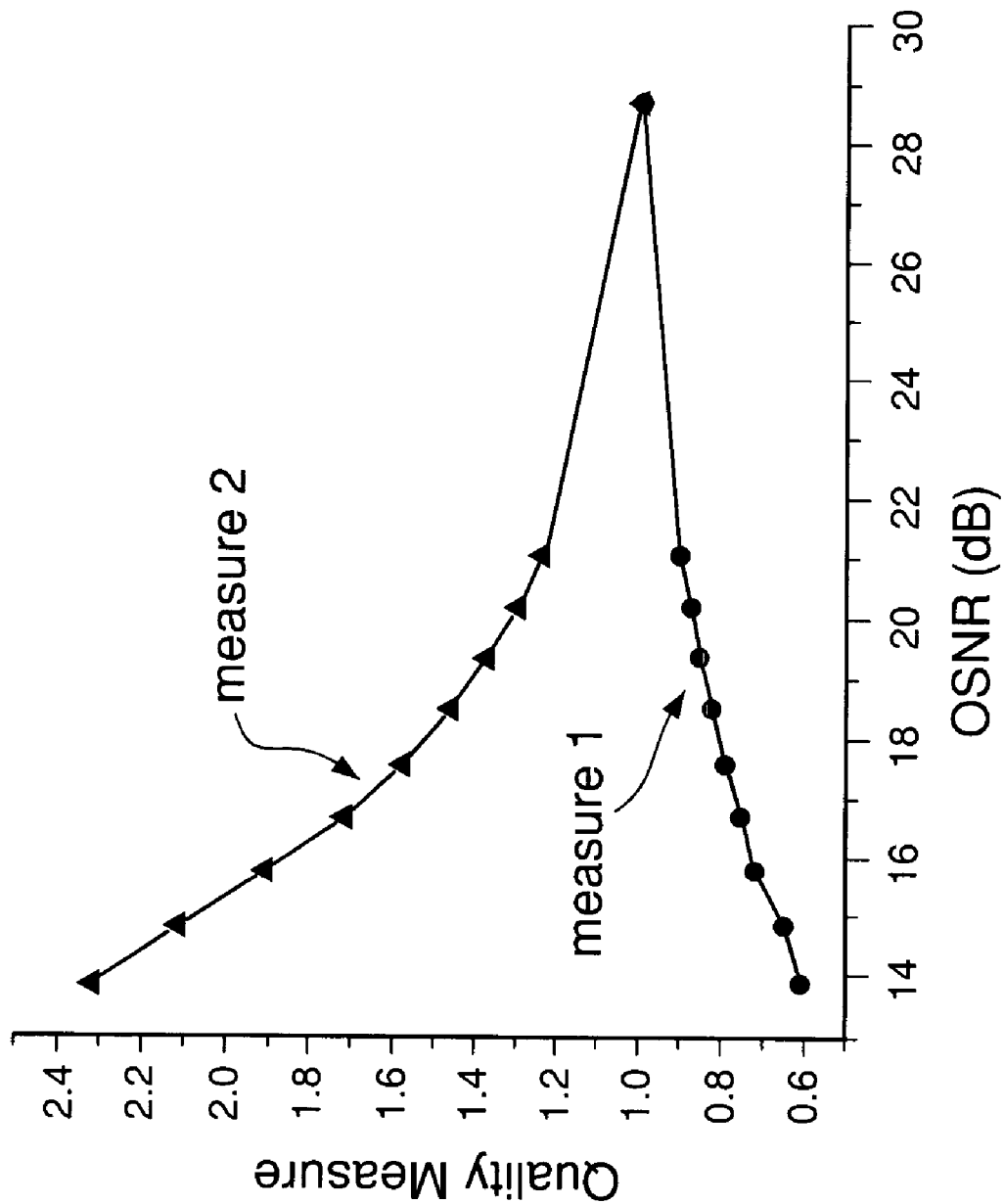
FIG. 5 graphically illustrates the behavior of two quality measures generated by the RM of FIG. 3 when said RM is configured in accordance with FIG. 4.

FIG. 5 shows two quality measures generated by RM 300 as functions of the OSNR of signal 304, when the RM is configured in accordance with FIG. 4. More specifically, measures 1 and 2 shown in FIG. 5 correspond to secondary ports 1 and 2, respectively, of processor 320. Each measure value is computed as described above, i.e., by determining the corresponding power ratio and then normalizing it to the ratio corresponding to minimum noise, i.e., maximum OSNR. The results of FIG. 5 indicate that each of measures 1 and 2 is sensitive to optical noise and therefore can be used to monitor the OSNR of signal 304.

Figure 6:
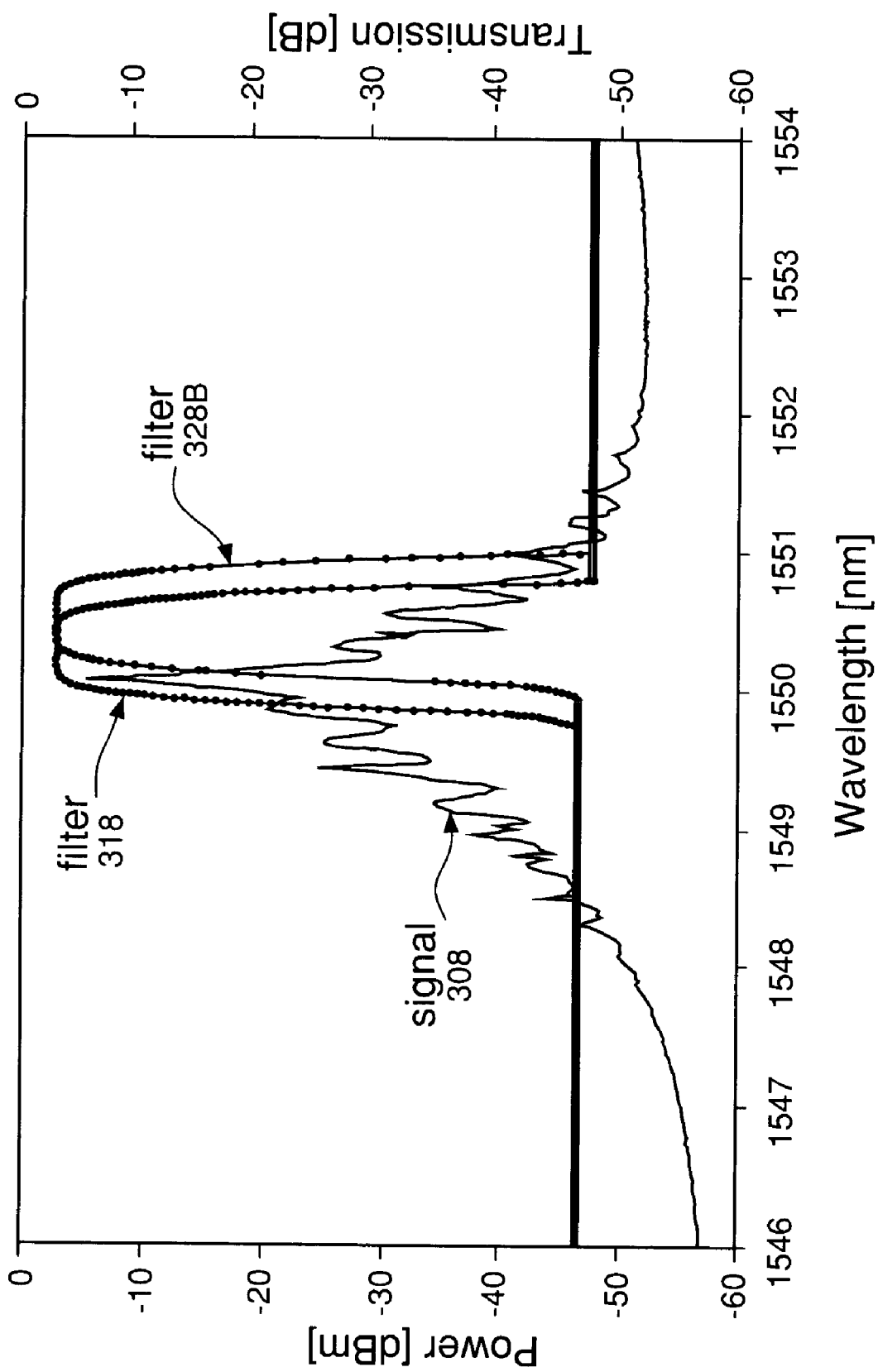
FIG. 6 graphically illustrates another representative configuration of the RM shown in FIG. 3.

FIG. 6 graphically illustrates another representative configuration of RM 300, which configuration may be used to evaluate the amount of chromatic dispersion in signal 304.

More specifically, FIG. 6 shows a representative spectrum of signal 308 corresponding to the following characteristics of signal 304 and beam 306. Signal 304 corresponding to FIG. 6 is similar to signal 304 corresponding to FIG. 4, but, in addition, it is distorted by chromatic dispersion in the amount of about 120 ps/nm. Beam 306 has a wavelength of about 1549.7 nm. FIG. 6 also shows representative transmission curves of filters 318 and 328B, each of which is a 0.8-nm band-pass filter, the former centered at about 1550.4 nm and the latter centered at about 1550.6 nm.

Figure 7:
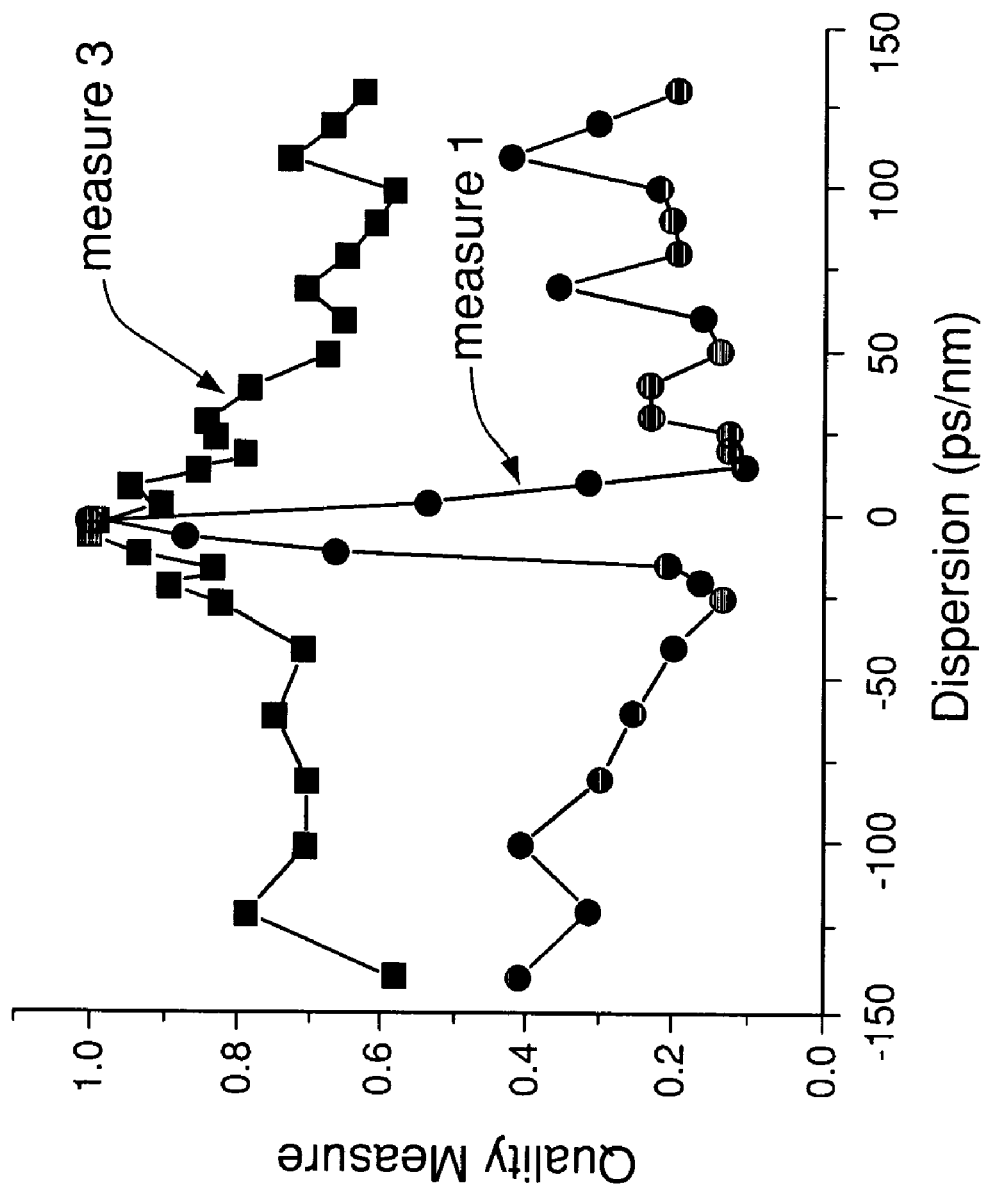
FIG. 7 graphically illustrates the behavior of two quality measures generated by the RM of FIG. 3 when said RM is configured in accordance with FIG. 6.

FIG. 7 shows two quality measures generated by RM 300 as functions of the amount of chromatic dispersion in signal 304, when the RM is configured in accordance with FIG. 6. More specifically, measures 1 and 3 shown in FIG. 7 correspond to secondary ports 1 and 3, respectively, of processor 320 and are computed by determining the corresponding power ratios and normalizing them to the ratio corresponding to the absence of dispersion. FIG. 7 indicates that each of measures 1 and 3 (i) adopts a value of about 1 in the absence of dispersion due to the normalization and (ii) has a value smaller than 1 when some amount of dispersion is present. As such, each of measures 1 and 3 can be used to monitor the amount of dispersion in signal 304. Furthermore, measures 1 and 3 may be used to implement signal processing that can reduce the amount of dispersion in signal 304. For example, in one configuration of network 200 (FIG. 2), a dispersion compensator (not shown) may be placed between section 206B of fiber 206 and RM 216. The compensator may then be configured to receive a feedback signal generated based on measures 1 and/or 3 shown in FIG. 7. Utilizing the relatively weak dependence of measure 3 on the amount of dispersion, the compensator can be coarse-tuned based on measure 3. Similarly, utilizing the relatively steep dependence of measure 1 on the amount of dispersion in the vicinity of zero dispersion, the compensator can be fine-tuned based on measure 1.

The combination of FIGS. 5 and 7 shows that the use of filter 318 provides an unambiguous indication of signal quality for both noise and distortion. The measured parameter decreases with decreasing signal quality, whether it is impaired by noise or distortion.

Figure 8:
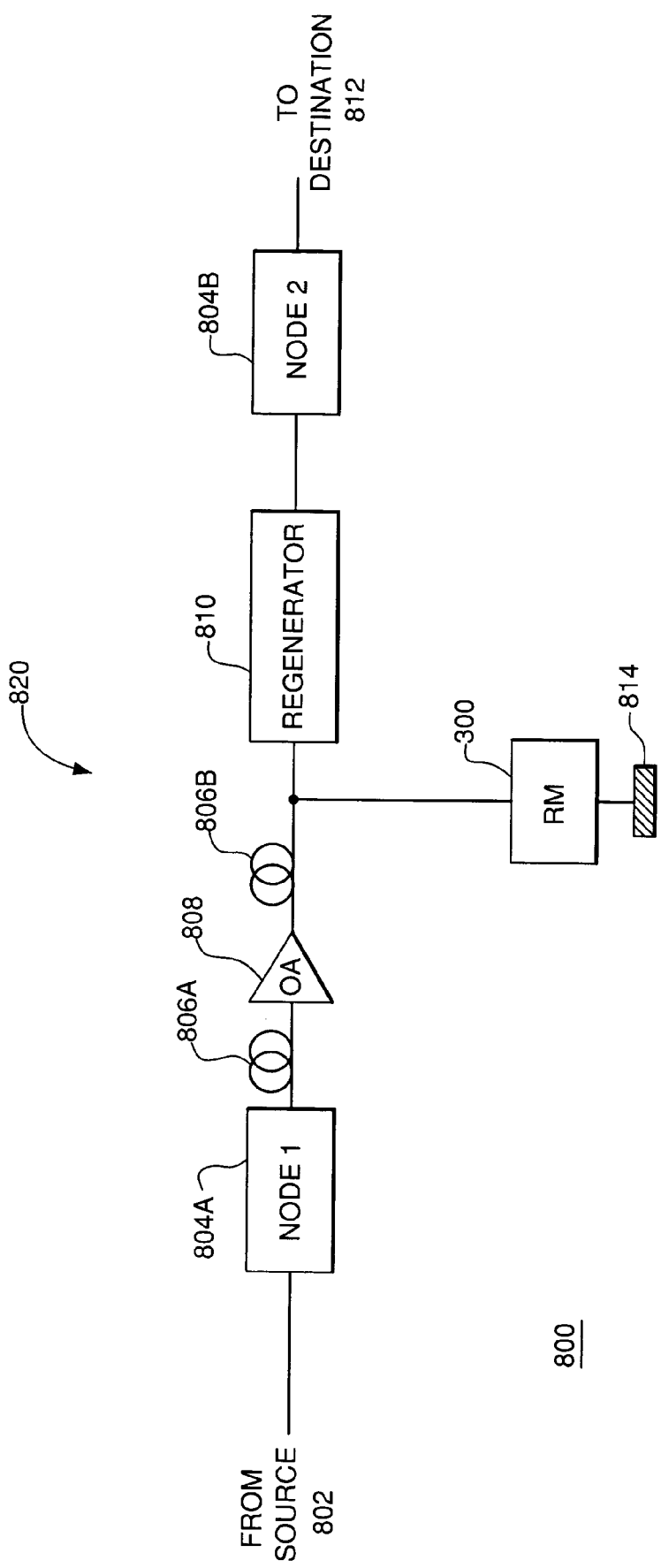
FIG. 8 shows a block diagram of a fiber-optic network according to another embodiment of the present invention.

FIG. 8 shows a block diagram of a fiber-optic network 800 according to another embodiment of the present invention. Network 800 is analogous to network 100 of FIG. 1 with analogous elements of the two networks marked with labels having the same last two digits. However, one difference between networks 800 and 100 is that network 800 has RM 300 (FIG. 3) configured as an OPM, which performs functions analogous to those of OPM 114 in network 100. More specifically, in network 800, RM 300 is configured such that optical regeneration of the RM is substantially disabled, e.g., by discarding regenerated signal 324 (FIG. 3) into a signal blocker 814. Alternatively, optical regeneration in RM 300 may be disabled by turning off CW source 312 (FIG. 3). As a result, in network 800, RM 300 acts substantially as an optical performance monitor, while regenerator 810 performs optical regeneration.

While this invention has been described with reference to illustrative embodiments, this description is not intended to be construed in a limiting sense. For example, although the present invention has been described in the context of 2R regenerators, it can similarly be used with suitable 3R regenerators. An RM of the invention may be designed to generate a desired number of quality measures and have a desired number of filters 328, including no such filters at all. Sampling at the output port of the RM (e.g., tap 302C) may optionally be removed. An RM of the invention may be used solely for monitoring, without being applied to regeneration of the signal and/or configured to operate without changing the signal carrier wavelength. Although the present invention has been described in the context of using an SOA, a different suitable nonlinear optical device exhibiting cross-gain and/or cross-phase modulation may be used, e.g., in place of SOA 316 (FIG. 3). For systems characterized by steady and/or known optical power at the input of RM 300, measuring said power with processor 320 may be excluded. Different mathematical operations may be applied to the obtained power values to generate different quality measures and different filter shapes and positions may also be applied. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. Apparatus, comprising:
   a nonlinear optical device (NOD) adapted to receive an optical input signal;
   a first optical filter coupled to an output of the NOD to produce a first filtered signal;
   a signal processor adapted to:
      measure optical power of the input signal;
      measure an optical power of the first filtered signal; and
      monitor signal quality of the input signal based on the optical power measurements;
   a first optical tap configured to provide the signal processor with a sample of the input signal;
   a second optical tap configured to provide the signal processor with a sample of the first filtered signal, wherein the signal processor is adapted to:
      measure optical power of each of said samples; and
      obtain the measurements of the optical power of the input signal and the first filtered signal based on the power measurements of said samples and characteristics of the first and second optical taps; and
   a continuous wave (CW) source coupled to the NOD, wherein:
      a light beam generated by the CW source is applied to the NOD together with the optical input signal; and
      the first optical tap samples the optical input signal before said input signal is combined with said light beam for the application to the NOD.

2. The apparatus of claim 1, wherein the NOD comprises a semiconductor optical amplifier (SOA).

3. The apparatus of claim 1, wherein the NOD exhibits at least one of cross-gain modulation and cross-phase modulation.

4. The apparatus of claim 1, comprising an optical regenerator, wherein said regenerator includes the NOD and the first filter and is designed to convert the input optical signal into an output optical signal such that said input and output signals represent a common data sequence.

5. The apparatus of claim 1, comprising two or more optical filters, wherein:
   each filter is coupled to the output of the NOD to produce a corresponding filtered signal; and
   the signal processor is further adapted to measure optical power of each filtered signal and to monitor signal quality of the input signal based on the optical power measurements of said filtered signals.

6. The apparatus of claim 4, wherein the output signal is a portion of the first filtered signal.

7. The apparatus of claim 4, wherein the input and output signals have different carrier wavelengths.

8. The apparatus of claim 4, wherein the regenerator is designed to reshape and re-amplify the input signal to generate the output signal.

9. The apparatus of claim 4, wherein the regenerator further includes said continuous wave (CW) source.

10. The apparatus of claim 5, further comprising an optical tap coupled to the output of the NOD and configured to produce two or more samples of a signal generated by the NOD and apply each sample to a respective optical filter, wherein each filtered signal represents a respective sample subjected to optical filtering in the respective filter.

11. The apparatus of claim 10, wherein the signal processor is configured to obtain power ratio between each filtered signal and the input signal to generate a respective quality measure, wherein the generated quality measures comprise at least one of a measure of optical noise and a measure of dispersion.

12. A method of monitoring signal quality, comprising:
(A) applying an input optical signal to a nonlinear optical device (NOD);
(B) optically filtering at least a portion of a signal generated by the NOD to produce a first filtered signal; and
(C) measuring optical power of the input signal;
(D) measuring an optical power of the first filtered signal;
(E) monitoring signal quality of the input signal based on the optical power measurements of steps (C) and (D), wherein:
the step of measuring the optical power of the input signal comprises: (C1) producing a sample of the input signal using a first optical tap, (C2) measuring optical power of the sample produced in step (C1), and (C3) obtaining the measurement of the optical power of the input signal based on the power measurement of step (C2) and characteristics of the first optical tap; and
the step of measuring the optical power of the first filtered signal comprises: (D1) producing a sample of the first filtered signal using a second optical tap, (D2) measuring optical power of the sample produced in step (D1), and (D3) obtaining the measurement of the optical power of the first filtered signal based on the power measurement of step (D2) and characteristics of the second optical tap; and
(F) applying to the NOD a continuous wave (CW) light beam together with the input optical signal, wherein the first optical tap samples the optical input signal before said input signal is combined with said light beam for the application to the NOD.

13. The method of claim 12, wherein the NOD comprises a semiconductor optical amplifier (SOA).

14. The method of claim 12, wherein the NOD exhibits at least one of cross-gain modulation and cross-phase modulation.

15. The method of claim 12, further comprising applying optical regeneration to the input signal to generate an output signal, wherein:
the input and output signals represent a common data sequence; and
the output signal is a portion of the first filtered signal.

16. The method of claim 12, further comprising:
applying optical filtering to the signal generated by the NOD to produce two or more filtered signals; and
measuring optical power of each of the filtered signals, wherein step (E) comprises monitoring signal quality of the input signal based on the optical power measurements of said filtered signals.

17. The method of claim 15, wherein the input and output optical signals have different carrier wavelengths.

18. The method of claim 15, wherein applying optical regeneration includes reshaping and re-amplifying the input optical signal.

19. The method of claim 15, wherein applying optical regeneration includes the step of applying to the NOD the CW light beam together with the input optical signal.

20. The method of claim 16, further comprising:
producing two or more samples of the signal generated by the NOD using an optical tap coupled to the output of the NOD; and
subjecting each sample to respective optical filtering to produce a respective filtered signal.

21. The method of claim 20, further comprising obtaining power ratio between each filtered signal and the input signal to generate a respective quality measure, wherein the generated quality measures comprise at least one of a measure of optical noise and a measure of dispersion.

22. An optical communication network configured to transmit optical communication signals between network nodes, the network including an apparatus comprising:
a nonlinear optical device (NOD) adapted to receive an input optical signal;
a first optical filter coupled to an output of the NOD to produce a first filtered signal; and
a signal processor adapted to:
measure optical power of the input signal;
measure an optical power of the first filtered signal; and
monitor signal quality of the input signal based on the optical power measurements;
a first optical tap configured to provide the signal processor with a sample of the input signal;
a second optical tap configured to provide the signal processor with a sample of the first filtered signal, wherein the signal processor is adapted to:
measure optical power of each of said samples; and
obtain the measurements of the optical power of the input signal and the first filtered signal based on the power measurements of said samples and characteristics of the first and second optical taps; and
a continuous wave (CW) source coupled to the NOD, wherein:
a light beam generated by the CW source is applied to the NOD together with the optical input signal; and
the first optical tap samples the optical input signal before said input signal is combined with said light beam for the application to the NOD.

23. Apparatus, comprising:
a nonlinear optical device (NOD) adapted to receive an optical input signal;
a first optical filter coupled to an output of the NOD to produce a first filtered signal;
a signal processor adapted to:
measure optical power of the input signal;
measure an optical power of the first filtered signal; and
monitor signal quality of the input signal based on the optical power measurements;

two or more optical filters, wherein:
- each filter is coupled to the output of the NOD to produce a corresponding filtered signal; and
- the signal processor is further adapted to measure optical power of each filtered signal and to monitor signal quality of the input signal based on the optical power measurements of said filtered signals; and
- an optical tap coupled to the output of the NOD and configured to produce two or more samples of a signal generated by the NOD and apply each sample to a respective optical filter, wherein each filtered signal represents a respective sample subjected to optical filtering in the respective filter.

24. The apparatus of claim 23, wherein the signal processor is configured to obtain power ratio between each filtered signal and the input signal to generate a respective quality measure, wherein the generated quality measures comprise at least one of a measure of optical noise and a measure of dispersion.

25. A method of monitoring signal quality, comprising:
- (A) applying an input optical signal to a nonlinear optical device (NOD);
- (B) optically filtering at least a portion of a signal generated by the NOD to produce a first filtered signal; and
- (C) measuring optical power of the input signal;
- (D) measuring an optical power of the first filtered signal; and
- (E) monitoring signal quality of the input signal based on the optical power measurements of steps (C) and (D), wherein the method further comprises:
  - applying optical filtering to the signal generated by the NOD to produce two or more filtered signals;
  - measuring optical power of each of the filtered signals, wherein step (E) comprises monitoring signal quality of the input signal based on the optical power measurements of said filtered signals;
  - producing two or more samples of the signal generated by the NOD using an optical tap coupled to the output of the NOD; and
  - subjecting each sample to respective optical filtering to produce a respective filtered signal.

26. The method of claim 25, further comprising obtaining power ratio between each filtered signal and the input signal to generate a respective quality measure, wherein the generated quality measures comprise at least one of a measure of optical noise and a measure of dispersion.

27. Apparatus, comprising:
- a nonlinear optical device (NOD) adapted to receive an optical input signal;
- a first optical filter coupled to an output of the NOD to produce a first filtered signal;
- a signal processor adapted to:
  - measure optical power of the input signal;
  - measure an optical power of the first filtered signal; and
  - monitor signal quality of the input signal based on the optical power measurements;
- a first optical tap configured to provide the signal processor with a sample of the input signal; and
- a second optical tap configured to provide the signal processor with a sample of the first filtered signal, wherein the signal processor is adapted to:
  - measure optical power of each of said samples; and
  - obtain the measurements of the optical power of the input signal and the first filtered signal based on the power measurements of said samples and characteristics of the first and second optical taps;

two or more optical filters, wherein:
- each filter is coupled to the output of the NOD to produce a corresponding filtered signal; and
- the signal processor is further adapted to measure optical power of each filtered signal and to monitor signal quality of the input signal based on the optical power measurements of said filtered signals; and
- an optical tap coupled to the output of the NOD and configured to produce two or more samples of a signal generated by the NOD and apply each sample to a respective optical filter, wherein each filtered signal represents a respective sample subjected to optical filtering in the respective filter.

28. The apparatus of claim 27, wherein the signal processor is configured to obtain power ratio between each filtered signal and the input signal to generate a respective quality measure, wherein the generated quality measures comprise at least one of a measure of optical noise and a measure of dispersion.

29. A method of monitoring signal quality, comprising:
- (A) applying an input optical signal to a nonlinear optical device (NOD);
- (B) optically filtering at least a portion of a signal generated by the NOD to produce a first filtered signal; and
- (C) measuring optical power of the input signal;
- (D) measuring an optical power of the first filtered signal; and
- (E) monitoring signal quality of the input signal based on the optical power measurements of steps (C) and (D), wherein:
  - the step of measuring the optical power of the input signal comprises: (C1) producing a sample of the input signal using a first optical tap, (C2) measuring optical power of the sample produced in step (C1), and (C3) obtaining the measurement of the optical power of the input signal based on the power measurement of step (C2) and characteristics of the first optical tap; and
  - the step of measuring the optical power of the first filtered signal comprises: (D1) producing a sample of the first filtered signal using a second optical tap, (D2) measuring optical power of the sample produced in step (D1), and (D3) obtaining the measurement of the optical power of the first filtered signal based on the power measurement of step (D2) and characteristics of the second optical tap;
- (F) applying optical filtering to the signal generated by the NOD to produce two or more filtered signals;
- (G) measuring optical power of each of the filtered signals, wherein step (E) comprises monitoring signal quality of the input signal based on the optical power measurements of said filtered signals; and
- (H) producing two or more samples of the signal generated by the NOD using an optical tap coupled to the output of the NOD; and
- (I) subjecting each sample to respective optical filtering to produce a respective filtered signal.

30. The method of claim 29, further comprising obtaining power ratio between each filtered signal and the input signal to generate a respective quality measure, wherein the generated quality measures comprise at least one of a measure of optical noise and a measure of dispersion.

* * * * *